United States Patent [19]

Beck et al.

[11] Patent Number: 4,717,558
[45] Date of Patent: Jan. 5, 1988

[54] PHOSPHORUS RECOVERY FROM PHOSPHORUS-CONTAINING POND SLUDGE

[75] Inventors: Steven M. Beck, Columbia, Tenn.; Edward H. Cook, Jr., Niagara Falls, N.Y.

[73] Assignee: Occidental Chemical Corporation, Niagara Falls, N.Y.

[21] Appl. No.: 924,476

[22] Filed: Oct. 29, 1986

[51] Int. Cl.$^4$ .............................................. B01D 12/00
[52] U.S. Cl. ...................................... 423/322; 210/710; 210/737; 210/772; 210/906
[58] Field of Search ............... 210/710, 737, 768, 772, 210/906, 907; 423/322, 323; 23/308 R

[56] References Cited

U.S. PATENT DOCUMENTS 4,399,037  8/1983  Diskowski et al. ................. 210/906
4,462,973  7/1984  Crea et al. ............................ 423/322
4,492,627  1/1985  Crea ........................................ 209/3

Primary Examiner—Peter Hruskoci
Assistant Examiner—Jeffrey W. Peterson
Attorney, Agent, or Firm—James F. Tao; William G. Gosz

[57] ABSTRACT

A process is described for recovering phosphorus from pond sludge found in ponds located near phosphorus plants. An aqueous solution of the sludge, which has a phosphorus concentration in the range of 5% to 70% by weight, is heated at a temperature in the range of 165° F. to 212° F., preferably for about ½ hour to about 6 hours, washed with water at an elevated temperature, and then reheated. A phosphorus layer having an enhanced concentration of recoverable elemental phosphorus is formed as a result of this process.

9 Claims, No Drawings

PHOSPHORUS RECOVERY FROM PHOSPHORUS-CONTAINING POND SLUDGE

BACKGROUND OF THE INVENTION

The present invention relates to a process for recovering elemental phosphorus from pond sludge which comprises heating a mixture of the sludge and water, washing the sludge at elevated temperatures, and reheating the sludge. Elemental phosphorus can be readily recovered from a concentrated phosphorus layer which forms during the treatment process.

Elemental phosphorus is produced commercially in an electric arc furnace by the thermal reduction of phosphate ore in the presence of coke and silica. The gaseous mixture produced by this process comprises phosphorus, water vapor, fluorosilicates, and other gaseous impurities, as well as entrained fine solid particles. This gas is condensed by contact with a water spray to form an aqueous phosphoruscontaining suspension. Upon settling, the suspension is allowed to stratify into three layers: a bottom layer of high purity liquid elemental phosphorus (i.e. 99% by weight or more), a top layer of water, and an intermediate layer of phosphorus sludge.

Phosphorus sludge is a semi-solid gel-like material having a relatively high viscosity when at rest. When in motion, however, the material acts as a liquid and the viscosity can drop to relatively low levels. The phosphorus sludge is considered to be an emulsion which is believed to be formed by the bonding of fine dirt particles to phosphorus particles. The amount of sludge formed in any particular process appears to be related to the quantity of solid particles in the gas stream fed to the condenser. This is in turn affected by the physical condition (particle size and fines content) of the burden constituents, by the operating conditions of the furnace, and by the effectiveness of any dust collectors in the furnace system. A detailed description of the composition and properties of phosphorus sludge is contained in U.S. Pat. No. 4,492,627, to Crea, issued Jan. 8, 1985.

The various waste water streams which are generated during phosphorus production are typically discharged in holding ponds located near the plant. This sludge, which is hereinafter referred to as "pond sludge", is an emulsion of phosphorus, solids and water having a relatively low phosphorus content and varying amounts of water and dirt, with the major portion of the pond sludge comprising water. A typical pond sludge composition contains about 20% phosphorus, 20% dirt, and 60% water, all by weight.

Although the total amount of phosphorus contained in a typical pond is substantial, reclamation of the phosphorus is a difficult proposition, both from the standpoint of physical and/or chemical treatment, as well as product economics. The emulsion is difficult to break using mechanical means since the phosphorus and dirt are chemically bound and difficult to separate. Chemical treatment can create environmental problems and is therefore generally avoided. In addition, the relatively high concentration of water makes evaporation of the pond sludge economically undesirable.

Previous attempts to reclaim phosphorus from pond sludge have used mechanical devices such as centrifugal separators. See, for instance, U.S. Pat. No. 4,492,627, which describes the use of a plurality of centrifugal separators operated in tandem to separate phosphorus from the dirt contained in the sludge. The use of centrifugal separators, however, is associated with certain disadvantages. The product must still be filtered which generally necessitates an intermediate settling step requiring several hours or days. The centrifuge waste also contains large amounts of residual phosphorus, and is therefore relatively inefficient.

U.S. Pat. No. 4,399,037, issued 1983 to Diskowski et al, describes a process for removing yellow phosphorus from phosphorus-containing waste water using a combination of mechanical, chemical and thermal treatment methods. The waste water is filtered in a centrifugal filter at a temperature of 50° C. to 70° C. and a pH in the range of 2.0 to 3.5, the filtrate is allowed to separate into a phosphorus layer and a treated water layer, and the waste water is finally treated with an oxidant and neutralized by reaction with calcium metasilicate.

As will be readily appreciated from the foregoing, an improved process for recovering elemental phosphorus from phosphorus sludge is highly desirable. Such a process should have the attributes of both technical simplicity and economic feasibility. The economics of any such process depend to a large extent on the efficient removal of water from the sludge prior to evaporation. Direct evaporation of the sludge is not cost effective since a large proportion of the energy spent during evaporation is used to remove water. In addition, the evaporators require extensive routine maintenance and repair, and the waste from the evaporator still contains large quantities of elemental phosphorus. Furthermore, the evaporators have capacity limitations and are not designed for handling charges of material containing concentrations of phosphorus below about 25%.

It is therefore a principal object of this invention to provide an efficient and relatively inexpensive process for recovering elemental phosphorus from phosphorus-containing sludge.

SUMMARY OF THE INVENTION

In accordance with the present invention, it has now been found that elemental phosphorus can be conveniently recovered from phosphorus-containing pond sludge by a process comprising the following steps:

(A) heating a mixture of pond sludge and water at a temperature of from about 165° F. to about 212° F. for at least about ½ hour, (B) washing the sludge with water at a temperature of from about 130° F. to about 150° F., (C) repeating step (A), and (D) recovering a product having an increased phosphorus concentration.

In a preferred embodiment, the heating steps are conducted at a temperature of from about 170° F. to about 190° F. for ½ hour to 6 hours, and the phosphorus content of the recovered product is at least about 80% by weight. A commercial grade elemental phosphorus can be obtained by a subsequent finishing treatment such as by filtration and/or evaporation.

DESCRIPTION OF THE PREFERRED EMBODIMENTS

The process of the present invention can be used to advantage for the thermal treatment of phosphorus-containing pond sludge. Pond sludge results from the discharge of various waste water streams generated during phosphorus production into holding ponds located near the plant. The composition of pond sludge can vary from about 5% to about 70% by weight of phosphorus, and preferably from about 15% to about 40% by weight, with the major fraction comprising water and smaller amounts of various insolubles. This sludge is chemically in the form of an emulsion of phosphorus in water. Generally speaking, although technically feasible, it is not presently economical to treat pond sludges having phosphorus concentrations in the range of 5%.

Pond sludge is typically removed from the pond using a dredge, and screened to remove larger particles, i.e. those having a diameter of 1 inch or more. The screened sludge can then be fed to a hydrocyclone.

The pond sludge is subjected to thermal treatment by heating it in a suitable vessel with water at a temperature of from about 165° F. to about 212° F. The vessel is equipped with a slow speed stirrer which provides mild agitation and prevents the formation of 2 or more layers of different composition within the vessel.

The duration of heating should be at least about ½ hour, and preferably from about ½ hour to about 6 hours. A longer heating duration can be used but it does not necessarily improve the overall results. In general, the duration of heating is inversely proportional to the heating temperature, with lower temperatures requiring longer durations.

Although the heating temperature can vary from about 165° F. to about 212° F., the boiling point of the mixture, a preferred temperature range is from about 170° F. to about 190° F. The use of boiling conditions, while technically effective, is undesirable due to (1) the higher energy required to maintain such temperatures on a commercial scale, and (2) the excessive vapors, such as phosphorus and phosphorus pentoxide vapors, generated under boiling conditions.

-The amount of water which is added to the sludge is not critical and can vary within a wide range. Typically, the ratio of the sludge weight to the weight of water is in the range of about 0.1 to about 2.0.

After heating, a dark grey crystalline material (or concentrated sludge) settles out of the mixture on the bottom of the vessel. This concentrated sludge is then washed with hot water at a temperature of from about 130° F. to about 150° F. Washing appears to result in the removal of dirt along with the associated water that is present as a dirt-water gel. The sludge remaining after washing is found to have a significantly enhanced elemental phosphorous content.

The sludge is then reheated under approximately the same conditions as the heating step outlined above. This can be conveniently accomplished by simply reheating the washed sludge in the heating vessel. After reheating, the sludge may have an elemental phosphorous content of 80% or more. The recovered product has the appearance of a shiny black solid at room temperature. A final washing step may be used, if desired, to increase the phosphorous concentration to 90% or more.

The recovered product can then be filtered or evaporated using existing and well known equipment and processes to produce a phosphorous product which is sufficiently pure to be sold as a commercial grade material. In this manner, treated sludge containing 88% elemental phosphorous and 11% dirt can be filtered to produce a product having an elemental phosphorous content of 98% or more. A treated sludge in accordance with this invention, i.e. having less than 10% dirt, can also be fed directly to an evaporator for upgrading at minimal operating cost.

The following examples are intended to illustrate various embodiments and advantages of the present invention without limiting it thereby.

EXAMPLE 1

595 Grams of a pond sludge containing 21.9% elemental phosphorus, 19.2% insolubles (dirt) and 48.9% water was mixed with 1200 grams of water in a 3-liter 3-necked flask. The mixture was heated to 169° F. with mild agitation. The heat-up time required about 15 minutes. The temperature was held at 169° F. for about 90 minutes with mild agitation provided by a stirrer. The heat-up time required about 15 minutes. The heating and stirring were stopped, and the sludge was allowed to settle. The bottom portion of the settled sludge analyzed as follows: 84.4% phosphorus, 3.3% insolubles, and 12.3% water.

A glass sparger was placed below the surface of the sludge for washing. Hot tap water at 135° F. was added at about 2 liters per hour with continual overflow out of the flask. After two hours of washing, 160 grams of material was collected. The collected material was 79.4% phosphorus, 1.8% insolubles and 18.8% water. It was calculated that 97.5% of the original phosphorus was recovered based on the original amount of sludge consumed.

EXAMPLES 2-4

35 pound samples of pond sludge and 10 gallons of water were charged into a Myers steam jacketed tank in pilot plant tests. Initial concentrations of phosphorus in the pond sludge sampled ranged from 16.8% to 39.4%. The balance of the sample consisted of dirt (15% to 20%) and occluded water.

All experiments were conducted using the following sequences of operations:
1. Heat at 180° F.
2. Wash with one 10 gallon volume of water at about 140° F.
3. Repeat step #1, and
4. Wash with three 10 gallons of water per wash at about 140° F.

Heating times were varied from two hours to six hours. In the test apparatus, washing volumes were effected by repetitively syphoning out existing water and adding a known volume of fresh hot water.

In Example 2, initial heating step #1 was for a 6-hour duration, and reheating step #3 was for a 5-hour duration. In Examples 3 and 4, both the heating and reheating steps were 4 hours in duration. The results of these experiments are shown below.

TABLE

| | STARTING MATERIAL | | | PRODUCT | | |
|---|---|---|---|---|---|---|
| Example | % $P_4$ | % Insolubles | % $H_2O$ | % $P_4$ | % Insolubles | % $H_2O$ |
| 2 | 39 | 22 | 39 | 97 | 3 | — |
| 3 | 21.7 | 23.9 | 54.4 | 92.9 | 2.7 | 4.4 |
| 4 | 16.8 | 14.1 | 69.1 | 93.4 | 1.0 | 5.6 |

Although various embodiments of this invention have been shown and described in the specification, this invention is intended to be construed liberally and not limited by any specific embodiments as will be readily appreciated by those skilled in the art. It is to be understood, therefore, that the appended claims are intended to cover all modifications and variations which are within the spirit and scope of the present invention.

What is claimed is:

1. A process for recovering phosphorus from phosphorus-containing pond sludge having a phosphorus concentration of from about 5% to about 70% by weight, said sludge being an emulsion of phosphorus in water, said process comprising the steps of:
   (a) mixing the pond sludge with additional water and heating the mixture in a vessel under mild agitation at a temperature of from about 165° F. to about 212° F. for at least about one-half hour to increase said phosphorus concentration in the sludge, said mild agitation being effective to prevent the formation of layers of different composition within the vessel,
   (b) allowing the concentrated sludge to settle to the bottom of the vessel,
   (c) introducing water at a temperature of from about 130° F. to about 150° F. into the vessel to wash the concentrated sludge.
   (d) repeating step (a) to further increase said phosphorus concentration in the sludge from step (c), and
   (e) recovering said sludge from step (d).

2. The process of claim 1 wherein the pond sludge has a phosphorus concentration of from about 15% to about 40% by weight.

3. The process of claim 1 wherein the sludge in steps (a) and (d) is heated to a temperature of from about 170° F. to about 190° F.

4. The process of claim 1 wherein the recovered product has a phosphorus concentration of at least about 80% by weight.

5. The process of claim 1 wherein the sludge from step (d) is again washed with water at a temperature of from about 130° F. to about 150° F.

6. The process of claim 1 wherein the recovered product has a phosphorus concentration of at least about 90% by weight.

7. The process of claim 1 wherein the sludge in steps (a) and (d) is heated for a time period of from about ½ hour to about 6 hours.

8. The process of claim 1 wherein the ratio of the weight of sludge to the weight of water added in steps (a) and (d) is in the range of about 0.1 to about 2.0.

9. The process of claims 4 or 6 wherein said sludge from step (e) is filtered or evaporated to increase its phosphorus concentration.

* * * * *